United States Patent [19]

Miller

[11] Patent Number: 4,628,958
[45] Date of Patent: Dec. 16, 1986

[54] RING VALVE

[76] Inventor: Stanley Miller, 19300 NW. Gillihan Rd., Portland, Oreg. 97231

[21] Appl. No.: 760,497

[22] Filed: Jul. 30, 1985

[51] Int. Cl.[4] ............................................. F16K 15/08
[52] U.S. Cl. ........................... 137/512.15; 137/512.3; 137/516.15; 417/562; 417/564
[58] Field of Search ........... 137/512.15, 512.3, 516.15, 137/852; 417/562, 564

[56] References Cited
U.S. PATENT DOCUMENTS

| 1,001,305 | 8/1911 | Rix | 417/564 X |
| 3,050,237 | 8/1962 | Nicholas | 417/564 |

FOREIGN PATENT DOCUMENTS

| 1063206 | 4/1954 | France | 137/516.15 |
| 132681 | 4/1929 | Switzerland | 137/512.15 |

Primary Examiner—Robert G. Nilson

[57] ABSTRACT

A ring valve apparatus is designed for efficient transfer of liquids and gases and for attaining near-perfect vacuum state of gases. Intake means consist of a flexible ring valve and three ports encompassed by valve seats. Exhaust means include a rigid ring valve, three port openings encompassed by valve, and three cylinders containing spring-loaded plungers. The configuration of the piston head and structure of the valves make possible a complete exhaustion of gases from a cylinder, a feature required for attaining near-perfect vacuum in a chamber.

6 Claims, 5 Drawing Figures

RING VALVE

BACKGROUND OF THE INVENTION

This invention relates to new and useful improvements in transport of liquids and gases and for attaining near-perfect vacuum within a gas chamber.

Devices heretofor have been proposed for creating sub-atmospheric pressures but are successful only in reducing pressure to about 28.5 inches of mercury ("hg.), thus failing to meet needs where a near-perfect vacuum is desired, such as for distilling water, wherein water boils at 212 degrees F., at standard atmospheric sea-level pressure but will boil at 35 degrees F. at a 29.7" hg. vacuum, but will boil at 35 degrees F. at 29.7" hg. Such devices utilize intake valves requiring a relatively high pressure to open, thus limiting the extent to which gas can be withdrawn from a vacuum chamber. Devices heretofor utilize valves which, because of their structure, have an air space between the piston and the intake valve, thus the piston must first create a partial vacuum before any gas can be withdrawn from the vacuum chamber beyond the intake valve. Piston pumps heretofor employ conventional single intake and single exhaust port openings which owing to their small size in relation to the size of the piston, are inefficiant owing to friction resulting from the gas or liquid being forced through a single small port opening.

This invention overcomes the inefficiancies inheritant in existing devices, thus providing a more efficiant transfer of gases and liquids through piston-type pumps employing conventional valves. It, furthermore, provides a capability of attaining a near-vacuum state of gases, heretofor unattainable by piston-type pumps employing conventional valves.

SUMMARY OF THE INVENTION

According to the present invention and forming a primary objective thereof, a device is disclosed for efficiantly transporting liquids and gases, and for providing a means of attaining near-perfect vacuum within a gas chamber, utilizing a piston-type pump.

A more particular object is to provide an intake valve which may be opened with minimal gas pressure and to provide a relationship of valves and piston such that no space exists between the valves and the piston at the initiation of the suction stroke.

A further object of the invention is to provide an intake and outlet means of high capacity, thus decreasing the resistance occurring in small openings, therefor providing greater efficiancy of piston-type pumps used for conveying gases and liquids.

The invention will be better understood and additional objects and advantages will become apparent from the following description of the drawings and detailed description of the invention:

DETAILED DESCRIPTION

Figure 1:
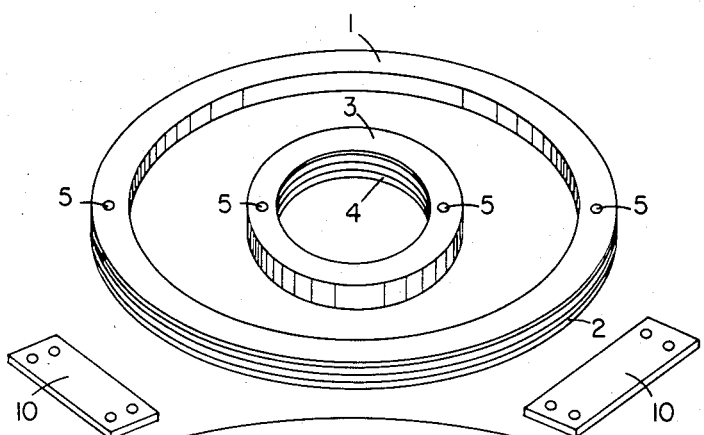
FIG. 1 is a perspective view of the outer outer exhaust valve seat unit 1 with threads 2, and inner exhaust valve seat unit 3 with threads 4. Holes 5 accommodate a spanner wrench.
Figure 2:
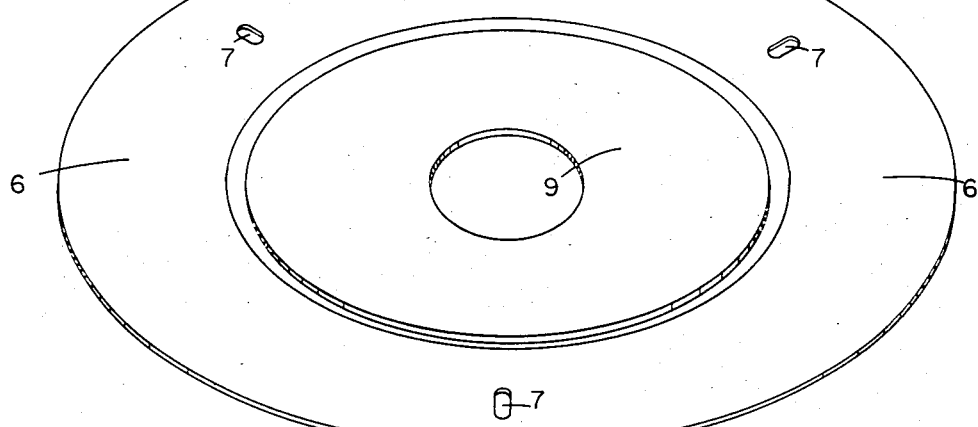
FIG. 2 is a perspective view of the intake valve 6 with slots 7 to accommodate pins 8, and exhaust valve 9. Also shown are two of the three holders 10, which secure the intake valve 6.
Figure 3:
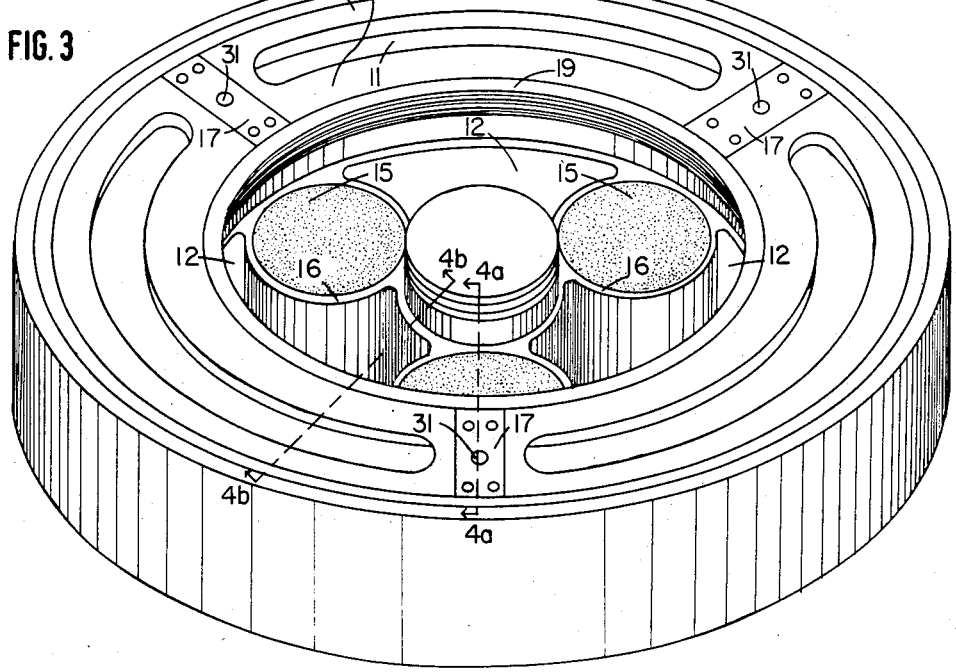
FIG. 3 is a perspective view of the cylinder head, showing the three intake ports 11 and the three exhaust ports 12. An outer intake valve seat 13 and an inner valve seat 14 encompass the three intake ports. The tops of the plungers 15 are shown within the cylinders 16. Holder seats 17 have holes 31 to accommodate pins 8. An inner circular wall 19 separates the exhaust means from the intake means, and three radial walls 32, as along line 4b—4b in FIG. 3, separate each of the three sets of port openings. An outer wall 20 contains the entire valve assembly.
Figure 4:
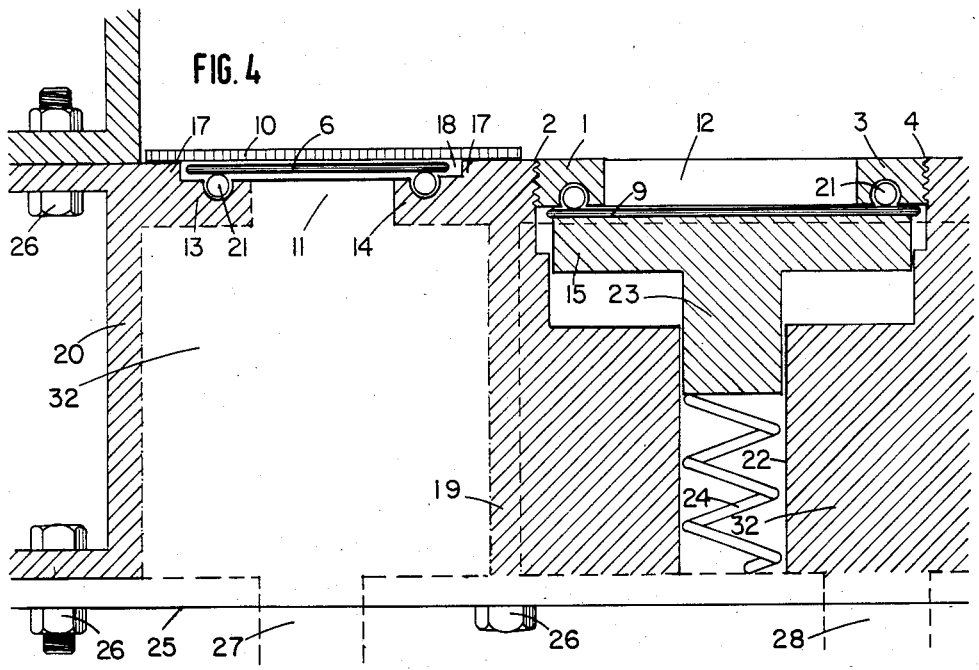
FIG. 4 is an enlarged sectional view taken along the line 4a—4a of FIG. 3. Dotted lines encompass open areas between the radial walls, as along lines 4b—4b of FIG. 3. Intake opening 27 and exhaust opening 28 are confined to one compartment; ie, the area between two of the radial walls, provided that holes are placed in these walls to permit passage of gases or liquids from the other two compartments. The intake valve 6 and its outer seat unit 13 and inner seat unit 14 are shown in cross-section. The holder seat 17 is designed with a space 18 to allow for contraction of the valve's diameter when in open position. Screws secure the holder to its seat 17. The exhaust valve 9 and its outer seat unit 1 and its threads 2 are shown in cross-section. Also shown is the inner seat unit 3 and its threads 4. O-rings 21 are fitted into each of the valve seats to insure a perfect seal. A reduced section 22 of the cylinder 16 contains the stem 23 of the plunger 15 and a coil spring 24. A plate 25 is secured to the outer wall 20 by bolts 26.
Figure 5:
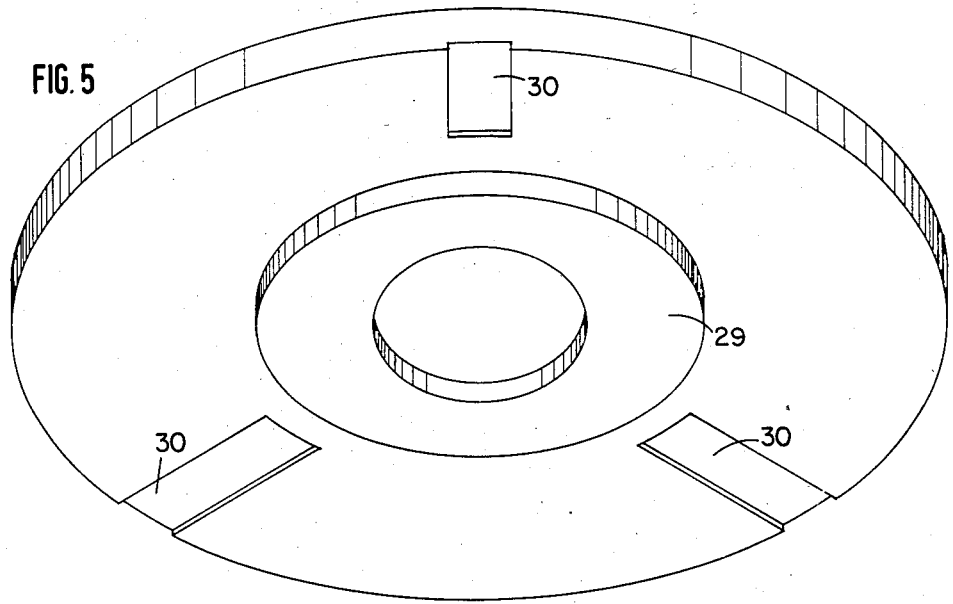
FIG. 5 is a prespective view of the top of the pump piston. The raised portion 29 is designed to fill the space adjacent to the exhaust valve 9 and between the outer 1 and inner 3 seat units when piston is at end of exhaust stroke. The three cutaway portions 30 are designed to accomodate the three valve holders 10.

In carrying out the objects of the invention, a devise mounted on a conventional piston-type pump, utilizes ring valves 6 and 9 instead of the conventional valves, the ring valve being novel in that it encompasses a circular area over the entire cicumference of the cylinder head, with three large intake ports 11 and three large exhaust ports 12, thus resulting in highly efficient intake and exhaustion of liquids and gases. The intake valve is of a high grade stainless steel capable of being bent under a given pressure, flexibility depending upon the pressure for which it is designed. The intake valve is mounted over the valve seat and held in place by three holders 10 spaced equidistant around the cicumference. The seat below the holder is designed with a space 18 to allow for contration of the cicumference of the valve while the segments between the holders are bent upward from the seat during the intake phase of the cycle. The width of the space determines the allowable contraction which, in turn, determines the allowable bending of the valve. The space is designed to prevent the valve from bending beyond the rupture point of the material. A pin 8 is placed in the hole 31 in the holder seat 17 and projected through the slot 7 in the intake valve to insure that each segment of the valve opens equally. The slot 7 permits radial contraction and expantion of the valve beneath the holder.

In a preferred embodiment, the exhaust valve 9 is rigid and is opened by pressure of the exhausting gases or liquids overcoming the force exerted by the plunger 15 and coil spring 24 in each of the three cylinders 16. The coil is designed to exert back pressure against the exhausting gas or liquid, such pressure exerted against the closed intake valve insures a tight seal, especially important when the valve is used in a vacuum pump.

OPERATION OF THE INVENTION

Operation of the invention is herein described, beginning the sequence with the piston adjacent to the cylinder head at the completion of the exhaust stroke. At this point the configuration of the cylinder head and the design of the ring valve assembly result in near perfect exhustion of the gases or liquids between the valves and piston. Upon initiation of the intake stroke, the pressure differential immediately opens the intake ring valve by bending the segments between the holders. Meanwhile, the exhaust valve is tightly closed by the pressure differential and by the pressure exerted by the plunger and spring assembly. At the end of the intake stroke the pressures on the two sides of intake valve equalize and the valve instantly straightens, thus closing the intake ports. Upon initiation of the exhaust stroke the pressure against the exhaust valve increases and upon reaching a predetermined pressure, the exhaust valve opens, allowing the gas or liquid to be exhausted. Complete exhaustion is accomplished when the piston again reaches a position adjacent to the cylinder head.

It is to be understood that the form of my invention herein shown and described is to be taken as a preferred example of the same and that various changes in the shape, size, and arrangement of parts may be resorted to without departing from the spirit of my invention or the scope of the subjoined claims.

Having thus described my invention, I claim:

1. A ring valve apparatus comprising:
   a cylinder head;
   an intake ring valve extending completely around the face of the cylinder head;
   three valve holders for securing the intake ring valve to the cylinder head;
   said valve ring having three segments capable of opening;
   an exhaust ring valve extending completely around the face of the cylinder head;
   said cylinder head having three cylinders each containing coil spring and plunger units to exert pressure against the exhaust valve;
   three semi-circular intake port openings in an outer circle in said cylinder head;
   three semi-circular exhaust port openings in an inner circle in said cylinder head;
   an inner and outer valve seat encompassing the intake port openings;
   said seats being fitted with O-rings;
   detachable inner and outer valve seat units encompassing the exhaust port openings;
   said detachable seats fitted with O-rings;
   said detachable seats having threads for mating with corresponding threads in the cylinder head.

2. The apparatus of claim 1 wherein said intake valve holders cooperate with a holder seat, slot, and pin to fix position of said valve.

3. The apparatus of claim 1 wherein the intake ring valve opens by bending of segments of the valve.

4. The apparatus of claim 2 wherein the holder seat is designed with a space to permit contraction of the cicumference of the intake ring valve when opening.

5. The apparatus of claim 4 wherein the opening of the intake ring valve is regulated by the space between an inner face of the valve and an adjacent portion of the holder seat.

6. The apparatus of claim 1 wherein the intake and exhaust port openings communicate with respective inlet and outlet means.

* * * * *